(12) United States Patent
Whitlow (10) Patent No.: US 7,228,344 B2
(45) Date of Patent: Jun. 5, 2007

(54) HIGH AVAILABILITY ENHANCEMENT FOR SERVERS USING STRUCTURED QUERY LANGUAGE (SQL)

(75) Inventor: Troy Charles Whitlow, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 989 days.

(21) Appl. No.: 10/097,989

(22) Filed: Mar. 13, 2002

(65) Prior Publication Data

US 2003/0177206 A1    Sep. 18, 2003

(51) Int. Cl.
*G06F 15/173*  (2006.01)
(52) U.S. Cl. .............. 709/220; 707/3; 707/100
(58) Field of Classification Search ......... 709/220, 709/221, 222; 707/3; 714/13, 6, 7, 11
See application file for complete search history.

(56) References Cited

U.S. PATENT DOCUMENTS

| | | | |
|---|---|---|---|
| 6,173,420 B1 * | 1/2001 | Sunkara et al. ............ 714/38 |
| 6,230,185 B1 | 5/2001 | Salas et al. | |
| 6,233,600 B1 * | 5/2001 | Salas et al. ............ 709/201 |
| 6,314,408 B1 | 11/2001 | Salas et al. | |
| 6,360,331 B2 | 3/2002 | Vert et al. | |
| 6,363,497 B1 * | 3/2002 | Chrabaszcz ............ 714/13 |
| 6,446,218 B1 * | 9/2002 | D'Souza ............ 714/4 |
| 6,453,426 B1 * | 9/2002 | Gamache et al. ......... 714/4 |
| 6,453,468 B1 * | 9/2002 | D'Souza ............ 717/168 |
| 6,594,786 B1 * | 7/2003 | Connelly et al. ......... 714/50 |
| 6,728,896 B1 | 4/2004 | Forbes et al. | |

(Continued)

FOREIGN PATENT DOCUMENTS

WO    WO 02/48866 A2    6/2002

OTHER PUBLICATIONS

Okun, M.; Barak, A.; "Atomic writes for data integrity and consistency in shared storage devices for clusters" Algorithms and Architectures for Parallel Processing, 2002. Proceedings. Fifth International Conference on Oct. 23-25, 2002 pp. 286-292.*

(Continued)

*Primary Examiner*—William C. Vaughn, Jr.
*Assistant Examiner*—Michael Gayeski (57) ABSTRACT

A method of providing high availability enhancement for servers using structured query language (SQL), includes: installing hardware for cluster configuration; installing an operating system, SQL application, and eRoom application in a first server; duplicating a disk image of the first server to a second server; performing an initial cluster configuration procedure for eventually permitting the first server and second server to function in a clustered configuration; performing an eRoom cluster configuration procedure to permit one of the first server and second server to run the eRoom application that is installed in a shared storage in the cluster configuration; and performing an SQL cluster configuration procedure to install the SQL application in the shared storage. An apparatus for providing high availability enhancement for servers using structured query language (SQL), includes: a cluster configuration including a first server, a second server, and a shared storage, where an eRoom application is configured to run on one of the first server and second server, with the eRoom application installed in a shared disk in the shared storage, and where the shared disk is configured to move to the other one of the first server and second server as part of the cluster configuration on fail-over.

36 Claims, 5 Drawing Sheets

U.S. PATENT DOCUMENTS

| | | | |
|---|---|---|---|
| 6,779,093 | B1 | 8/2004 | Gupta |
| 6,801,949 | B1 * | 10/2004 | Bruck et al. ................. 709/232 |
| 6,820,136 | B1 | 11/2004 | Pham et al. |
| 6,857,082 | B1 * | 2/2005 | Josan et al. .................... 714/4 |
| 6,859,834 | B1 | 2/2005 | Arora et al. |
| 6,871,300 | B1 | 3/2005 | Irving et al. |
| 6,895,534 | B2 * | 5/2005 | Wong et al. .................. 714/55 |
| 2002/0002607 | A1 | 1/2002 | Ludovici et al. |
| 2002/0161875 | A1 | 10/2002 | Raymond |
| 2003/0105732 | A1 | 6/2003 | Kagalwala et al. |

OTHER PUBLICATIONS

Author Unknown. "SQL Server Clustering Tips". Published Jun. 17, 2001. Accessed from http://web.archive.org/web/20010617175351/http://www.sql-server-performance.com/clustering.asp.*

"Multipurpose Web Publishing Using HTML, XML, and CSS" by Lie et al., Communications of the ACM, ACM, USA, vol. 42, No. 10, Oct. 1999, pp. 95-101.

Microsoft Windows 2000 Server, Internet Information Services 5.0 Technical Overview, Windows 2000 White Paper, Microsoft Corp. Total pages: 39.

What's New In eRoom Version 6, A Summary of New Features, May 10, 2002, eRoom Technology, Inc. Total pages: 5.

eRoom v6 Add-on Software Downloads, eRoom Technology,Inc., Jul. 18, 2002. [webpages] [online]. Retrieved on Apr. 27, 2005. Retrieved from the Internet: http://web.archive.org/web/20021210164719/www.eroom.com/CC_content/addon.asp. Total pages: 2.

RSA SecurID Ready Implementation Guide, Mar. 12, 2002, RSA SecurID Total pages: 9.

* cited by examiner

HIGH AVAILABILITY ENHANCEMENT FOR SERVERS USING STRUCTURED QUERY LANGUAGE (SQL)

TECHNICAL FIELD

This disclosure relates generally to communication networks, and more particularly to an apparatus and method for providing a high availability enhancement for servers using structured query language (SQL).

BACKGROUND

Web collaboration and e-business solutions may be provided by use of an application known as the eRoom server application ("eRoom") from eROOM TECHNOLOGIES, INCORPORATED<www.eroom.com>. eRoom can run on the MICROSOFT WINDOWS 2000 server family of products from MICROSOFT CORPORATION, Redmond, Wash. One version of eRoom can be deployed using either a built-in database engine which utilizes SQLAnywhere or deployed using the Microsoft SQL 2000 server or SQL Server 7 database. Both deployment methods are stand-alone installations, meaning that the eRoom and SQLAnywhere run on the same machine with no redundancy. When used with Microsoft SQL, the database engine can reside locally on the eRoom server or on a different server.

Both deployment methods do not provide for redundancy or high availability features. For example, the eRoom server application does not support the Microsoft Clustering Service as a native feature. Instead, methods, such as fault tolerant hardware and disk configurations combined with full system backups, are the current and non-robust techniques to protect an eRoom instance.

Therefore, current technologies, such as eRoom, are unable to support a clustered highly available instance which would be useful in, for example, critical applications or in an environment with many users. For example, the eRoom application does not support clustering as a native feature and is advertised as a stand-alone application. Therefore, current technologies are limited in their capabilities and suffer from at least the above constraints.

SUMMARY

In one embodiment of the invention, a method of providing high availability enhancement for servers using structured query language (SQL), includes: installing hardware for cluster configuration; installing an operating system, SQL application, and eRoom application in a first server; duplicating a disk image of the first server to a second server; performing an initial cluster configuration procedure for eventually permitting the first server and second server to function in a clustered configuration; performing an eRoom cluster configuration procedure to permit one of the first server and second server to run the eRoom application that is installed in a shared storage in the cluster configuration; and performing an SQL cluster configuration procedure to install the SQL application in the shared storage.

In another embodiment, an apparatus for providing high availability enhancement for servers using structured query language (SQL), includes: a cluster configuration including a first server, a second server, and a shared storage, where an eRoom application is configured to run on one of the first server and second server, with the eRoom application installed in a shared disk in the shared storage, and where the shared disk is configured to move to the other one of the first server and second server as part of the cluster configuration on fail-over.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
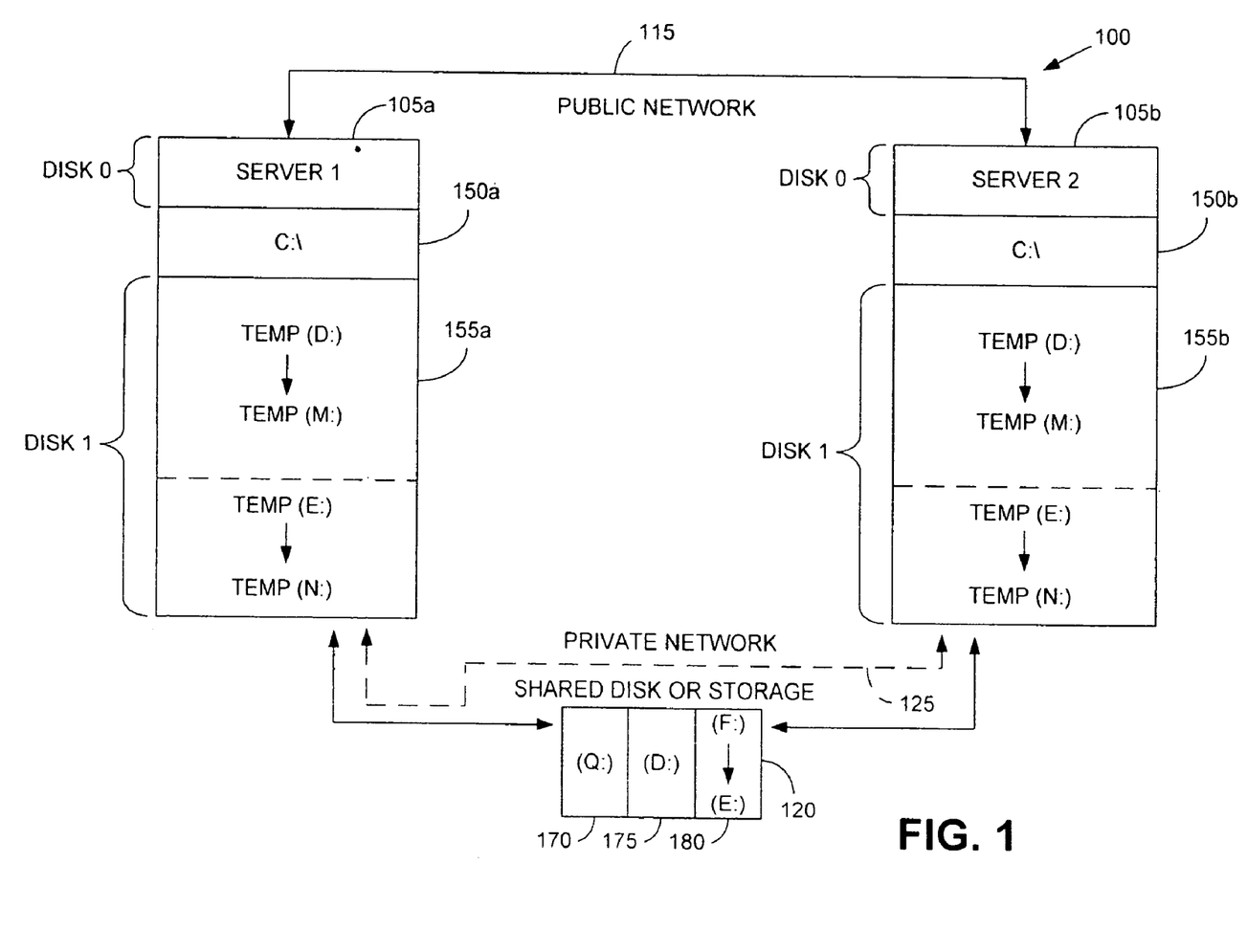
FIG. 1 is a block diagram of an apparatus in accordance with an embodiment of the invention.

FIG. 1 is a block diagram of an apparatus 100 in accordance with an embodiment of the invention. It is noted that the elements, identifying names, and/or states shown in FIG. 1 are not necessarily all present at a given time. Various elements, identifying names, and/or states are shown in FIG. 1 for purposes of describing a functionality of an embodiment of the invention and should not be construed to limit the scope of the invention.

In an embodiment, the apparatus 100 includes a first server (server 1) 105a connected to a second server (server 2) 105b via a public network 115 such as, for example, a local area network (LAN). Both servers 105a and 105b can access a shared storage system 120. The node cluster configuration (hereinafter "cluster") in FIG. 1 is defined by the servers 105a and 105b, shared storage system 120, and private network 125 for transmitting heartbeat traffic.

In one embodiment, the servers 105a and 105b are of the same type so that the similar hardware between the two servers 105a and 105b improves performance from a standard-standpoint. However, it is not a requirement that both servers 105a and 105b are of the same type of hardware.

In one embodiment, the server 105a may include eRoom resources, while the server 105b may include SQL resources. As known to those skilled in the art, SQL is a standardized query language for requesting information from a database. The servers 105a and 105b can be any type of machine that use SQL and are not necessarily limited to a requirement of using eRoom resources.

As described below, in an embodiment, an eRoom instance is created in the appropriate cluster resources. Additionally, an SQL instance is configured to provide database protection. Each server (or node) in the cluster has a specific function. The first server 105a is, for example, the primary owner of the eRoom virtual server, while the second server 105b is, for example, the primary owner of the SQL virtual server. This permits optimal performance for each instance, with system resources available for virtual servers to fail-over. Each virtual server includes the needed resources necessary for eRoom and SQL to function in the cluster. For example, the resource group for eRoom to function in the cluster may include the elements shown in Table 1.

TABLE 1 eRoom resource group physical disk
Internet Protocol (IP) address
network name
IIS Admin service
World Wide Web Services service
Simple Mail Transport Protocol Service
FTP Publishing service
Internet Information Server (IIS)
virtual root default File Transfer
Protocol (FTP)
IIS virtual root - default web
eRoom scheduler service
eRoom extension manager service
ERoom Diagnostics service As another example, the resource group for SQL to function in the cluster may include the elements shown in Table 2.

TABLE 2

SQL resource group physical disk
SQL IP address
SQL network name
SQL server
SQL agent
SQL full text Both servers 105a and 105b in the cluster are typically designed with enough system resources to handle the load of resources that are failed over to the surviving server (node). If a server (node) owning the eRoom resource were to fail, the resources would move automatically to the other server (node) and resume service. The same is true for the SQL instance, where during a failure of a server (node) that owns the SQL resources, the resources would move automatically to the surviving server (node). The operation of an embodiment of an apparatus 100 is described in conjunction with the flowchart shown in FIG. 2.

Figure 2:
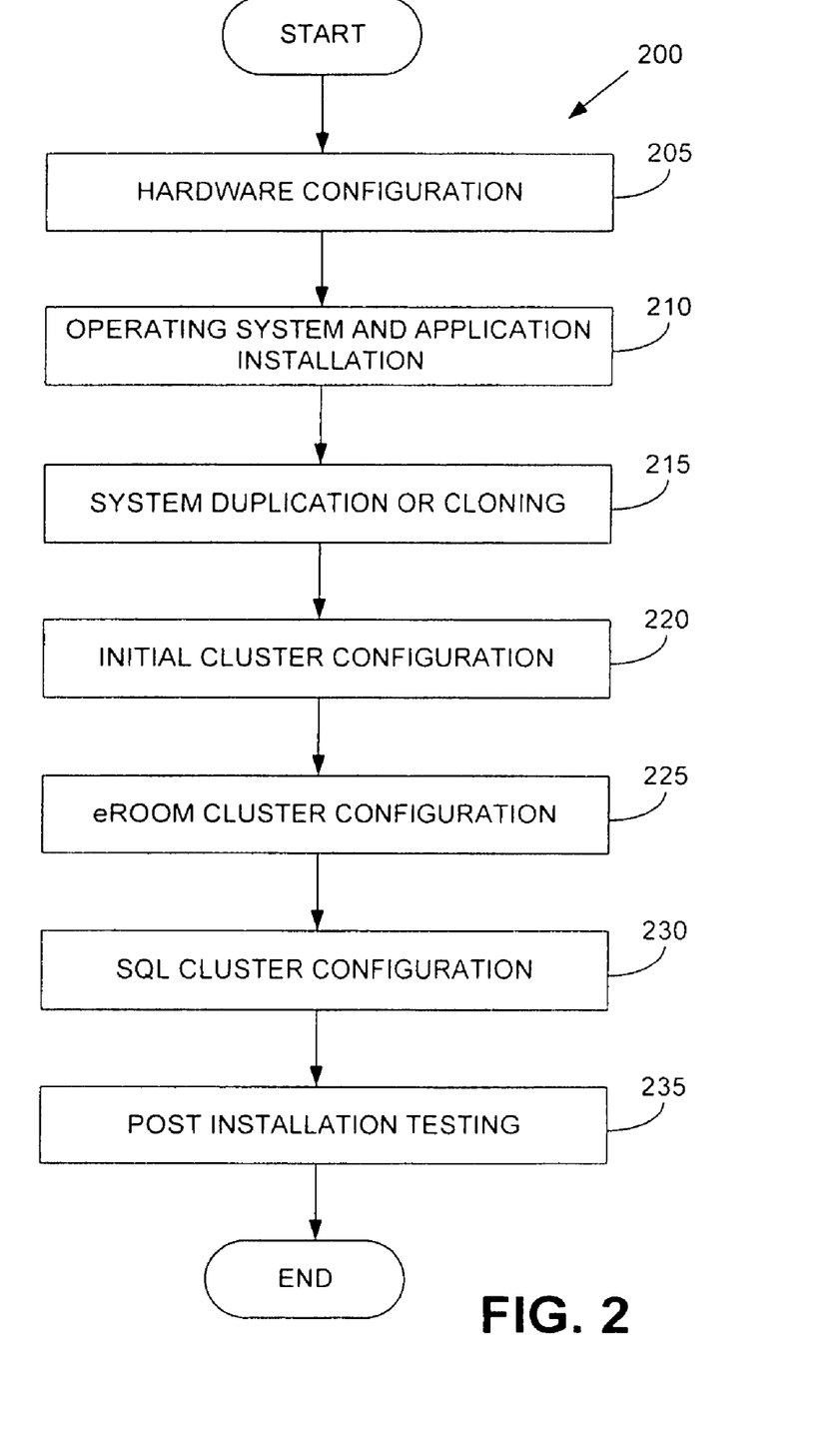
FIG. 2 is a high-level flowchart of a method in accordance with an embodiment of the invention.

FIG. 2 is a high-level flowchart illustrating a process or method 200 of enhancing the eRoom application to provided for high availability without the need for any modification to the eRoom source code or any custom programming, in accordance with an embodiment of the invention. This process 200 includes the cloning of servers (nodes) to each run eRoom independently with identical data. Once the clone is complete, the eRoom data is migrated to a clustered disk environment (i.e., a shared storage system 120), along with the necessary cluster resources. Additionally, the SQL servers servicing the cloned machines are removed and a clustered instance of SQL is used for the final configuration.

An embodiment of the process 200 for enhancing the eRoom application to provide for high availability, in accordance with an embodiment of the invention, is now discussed. It is noted that the names used to identify the elements or actions in the drawings (e.g., "C:\" disk, "D:" disk, "E:" disk, "M:" disk, "Q:\" disk, and/or the like) are only provided as some possible examples to identify the elements or actions, and other names may be used as well to identify the elements and actions shown in the drawings and discussed in the text.

Hardware Configuration (Action 205)

In action (205), all necessary hardware for clustering (or cluster configuration) is installed in the servers 105a and 105b. The hardware to be installed includes, for example, a Small Computer System Interface (SCSI) controller that is cluster-capable and additional network interface cards (NICs) for the networking functions. All hardware devices are typically installed in the same slots for each of the servers 105a and 105b. Additionally, in one embodiment, the hardware is check for compliance with the Microsoft Hardware Compatibility List (HCL).

Operating System and Application Installation (Action 210)

In action (210), an operating system is first installed in one of the servers (e.g., first server 105a). For example, the operating system is the Windows 2000 Advanced Server Application which may be installed in a (C:\) disk (memory 150a). By use of the operating system, a temporary (D:) disk and temporary (E:) disk are created in a non-shared disk subset (or memory 155a). The temporary (D:) disk and temporary (E:) disk are partitioned in the memory 155a.

Also, in action (210), a standard SQL installation is performed. SQL program files may be installed in the (C:\) disk, and SQL data files may be installed in the (E:) drive. The server 105 is restarted after completing the SQL installation.

Also, in action (210) a standard eRoom application installation is performed. For example, the eRoom 5.x SQL version is installed in the server 105a. Scripts files and eRoom setup files may be installed to a default path (C:\Inetpub) in the (C:\) disk, and eRoom program files and eRoom server data may be installed in the (D:) disk.

Thus, the server 105 is now fully functional as a stand-alone server with eRoom and SQL functionality.

System Duplication or Cloning (Action 215)

In action (215), an image or snapshot of the server 105a is taken and duplicated in the server 105b. Two different methods may be used to duplicate or clone an image or snapshot of the server 105a. First, standard backup software may be used to clone the image or snapshot of the server 105a. The backup software will perform a full backup of the images in the first server 105a to the second server 105b. The use of a standard backup software for cloning typically requires a minimum operating software image to first be installed in second server 105b and empty (D:) and (E:) disk spaces be present in the second server 105b prior to the cloning action. Additionally, the standard backup software typically requires the name of the second server 105b to be changed to the name of the first server 105a.

Alternatively, a disk imaging product, a disk imaging product may be used to clone the image or snapshot of the server 105a. An example of a suitable disk imaging product is of type such as NORTON GHOST from SYMANTEC CORPORATION.

Thus, in action (215), the (C:\) disk image or snapshot in memory 150a of server 105a is cloned into a (C:\) disk (memory 150b) of second server 105b. The (D:) and (E:) disk images or snapshots in memory 155a of server 105a is cloned into the (D:) disk and (E:) disk (memory 155b) of second server 105b.

The first server 105a is then taken off-line. An IP address and Network Name is assigned to second server 105b. Additionally, other appropriate networking properties are changed in the second server 105b. The first server 105a is then placed back on-line.

As a result, both servers 105a and 105b can run as stand-alone servers with eRoom and SQL functionality. Both servers 105a and 105b may be tested for correct functionality.

Initial Cluster Configuration (Action 220)

In action (220), the cluster server (shared storage system 120) is installed. An initial cluster configuration procedure is performed for eventually permitting both servers 105a and 105b to function in the clustered environment. As shown in FIG. 1, the drive letters of logical disk (D:) in first server 105a is changed to (M:). Similarly, the drive letters of logical disk (D:) in second server 105b is changed to (M:). The drive letters of logical disks (E:) on both servers 105a and 105b are also changed to (N:).

In action (220), in an embodiment, logical disks are created in the available disk sets in the shared cluster disk system 120 (FIG. 1) by use of a Disk Administrator in first server 105a. For example, the following separated disks are created in the shared disk system 120: disk (Q:) (i.e., memory 170) for the cluster Quorum disk, disk (D:) (i.e., memory 175) for eRoom Server Data, and disk (F:) (i.e., memory 180) for SQL installation.

Thus, the first server 105a (or second server 105b) will have six (6) logical drives (three on the non-shared bus and three on the shared cluster bus).

eRoom Cluster Configuration (Action 225)

In action (225), eRoom is first shut down. eRoom program files and eRoom server data in the (M:) disk of, for example, the first server 105a are then copied to the (D:) disk (memory 175) of the shared storage 120. eRoom is again turned on. Testing is also performed to verify that the eRoom cluster resource in the shared storage 120 can move to the second server 105a. Thus, both servers 105a and 105b can use the shared storage 120 to run eRoom. Typically, the eRoom application will run on only one of the nodes (e.g., first server 105a) that owns the disk (D:) in the shared storage 120 (i.e., active/passive state). The shared disk (D:) will move over to the other node (e.g., second server 105b) as part of the cluster on fail-over.

SQL Cluster Configuration (Action 230)

In action (230), all SQL services in both servers 105a and 105b are stopped, and SQL is uninstalled on both servers 105a and 105b. The disk drive letter on first server 105a is changed from (E:) to (N:), and the shared cluster disk (F:) (i.e., memory 180) is changed to (E:). The disk drive letter on the second server 105b is changed from (E:) to (N:).

SQL installation is then performed to install SQL to disk (E:) in the shared storage 120. User databases in the servers 105a and 105b are copied to the disk (E:) in the shared storage 120.

On the first server 105a and second server 105b, all Open Database Connectivity Format (ODBC) connections for the eRoom databases are reset to point the servers 105a and 105b to the shared storage 120. Thus, SQL is now running in a clustered mode, and eRoom is pointing to the databases in the shared storage 120 disk (D:).

The cluster resources on the servers 105a and 105b are set up, and the virtual IIS instances are also set up so that eRoom can run under a virtual name. This permits the use of a one-entry name no matter where eRoom is running (whether eRoom is running on first server 105a or second server 105b).

The temporary disks (M:) and (N:) in the servers 105a and 105b are then removed.

Post Installation Testing (Action 235)

In action (235), eRoom functionality is tested using the virtual web address defined in the eRoom cluster resource setup for verification. The eRoom resource group is moved to second server 105b and tested again. The eRoom resource group is then returned to first server 105a. The SQL resource is also tested by moving the resource back and forth between the servers 105a and 105b.

Figure 3:
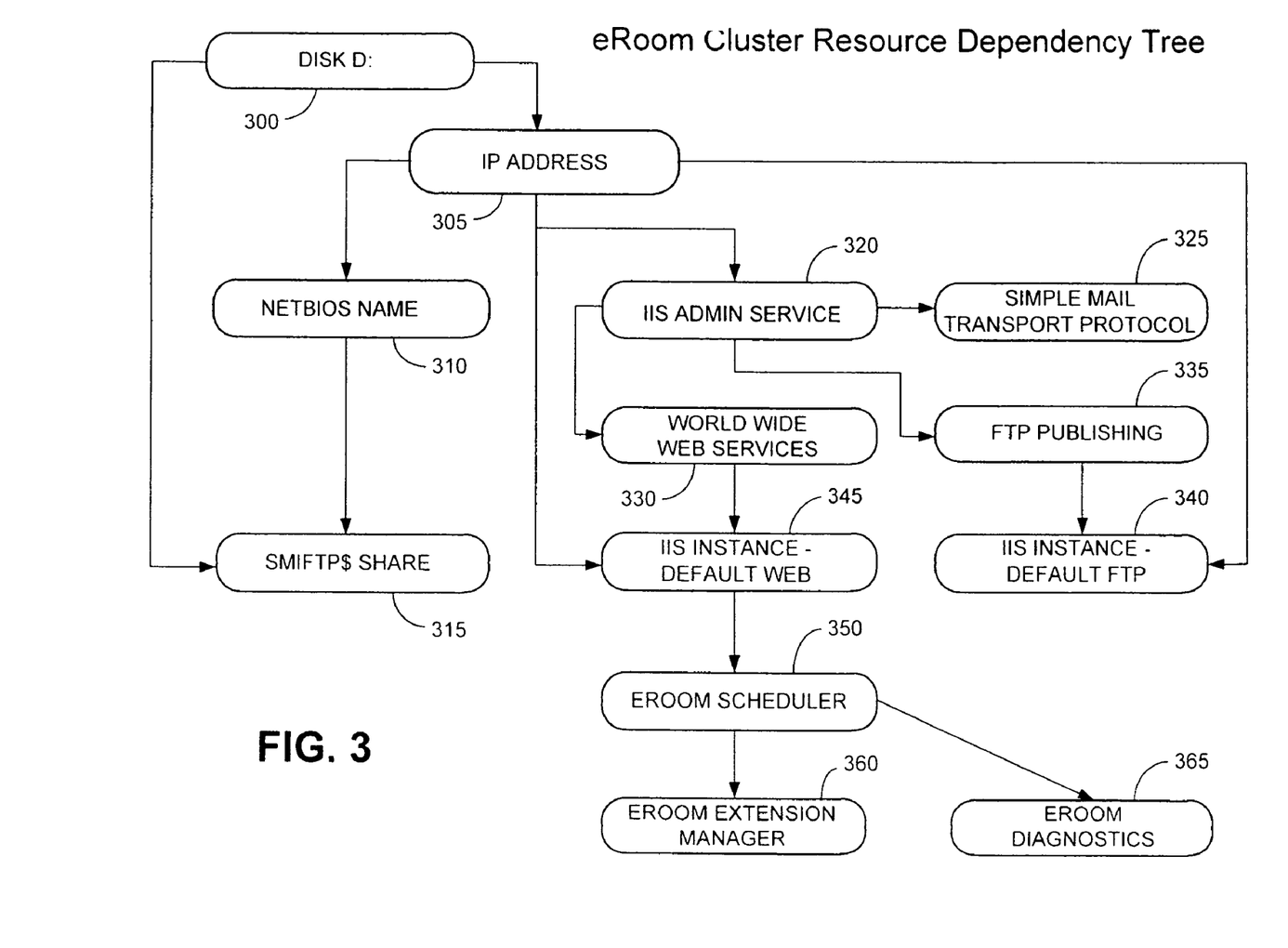
FIG. 3 is a functional block diagram showing cluster resource dependencies within an administrator software tool for administering the cluster, in accordance with an embodiment of the invention.

FIG. 3 is a functional block diagram showing cluster resource dependencies within an administrator software tool for administering the cluster, in accordance with an embodiment of the invention. When the disk (D:) comes on line, an IP address is assigned (305) and a NetBIOS (Network Basic Input/Output System) name is assigned (310) to the web address being used by the server. The share application 315 that is used for transferring files can be optional in this case. The IIS Administrative Service, which is made as part of the cluster and typically requires the IP address in action (305), then starts (320) and can start and control the simple mail transport protocol (325) and world wide web services (330). The IIS Administrative Service can also start the FTP Publishing service (335). The web services can start (345) the IIS instance for the default web, and the FTP publishing instance can start the (340) the IIS instance for the default FTP. The IIS instance can start eRoom services such as the eRoom scheduler (350) and eRoom Extension Manager (360). eRoom diagnostics may also be performed (365). The dependencies in FIG. 3 are set up so that the eRoom application can be controlled by using the services inside the cluster.

The cluster Disk D: (300) is the foundation eRoom resource for the cluster dependencies. Without the disk resource online all other resources will fail to be available. IP Address (305) is dependent on the successful availability of the disk resource (300) and serves as a required resource for the NETBIOS Name resource (310), IIS Admin Service (320), IIS Instance—Default Web (345) and IIS Instance—Default FTP (340). The IP Address (305) is typically the virtual address, which web users connect to the eRoom application. The NETBIOS Resource (310) is dependent on IP Address (305) and the SMIFTP$ Share resource is dependents on NETBIOS Name (310) and Disk D: (300)

For the purpose of providing a clean web environment on each cluster node the standard IIS services are configured into the cluster configuration. Generic cluster services are created with following dependencies. IIS Admin Service (320) is the starting point for the IIS services which are all dependent on that resource availability and is dependent on IP Address (305). Simple Mail Transport Protocol (325), World Wide Web Services (330), and FTP Publishing (335) are all dependent on IIS Admin Service (320). The IIS Instance-Default Web (345) is dependent on IP Address (305) and World Wide Web Services (330). The IIS Instance-Default FTP (340) is dependent on IP Address (305) and FTP Publishing (335)

The eRoom services are also configured for control by the cluster configuration via the creation of generic cluster services with the following dependencies. eRoom Scheduler (350) is dependent on IIS Instance-Default Web (345). eRoom Extension Manager (360) and eRoom Diagnostics (365) are both dependent on the eRoom Scheduler (350) for functionality.

Figure 4:
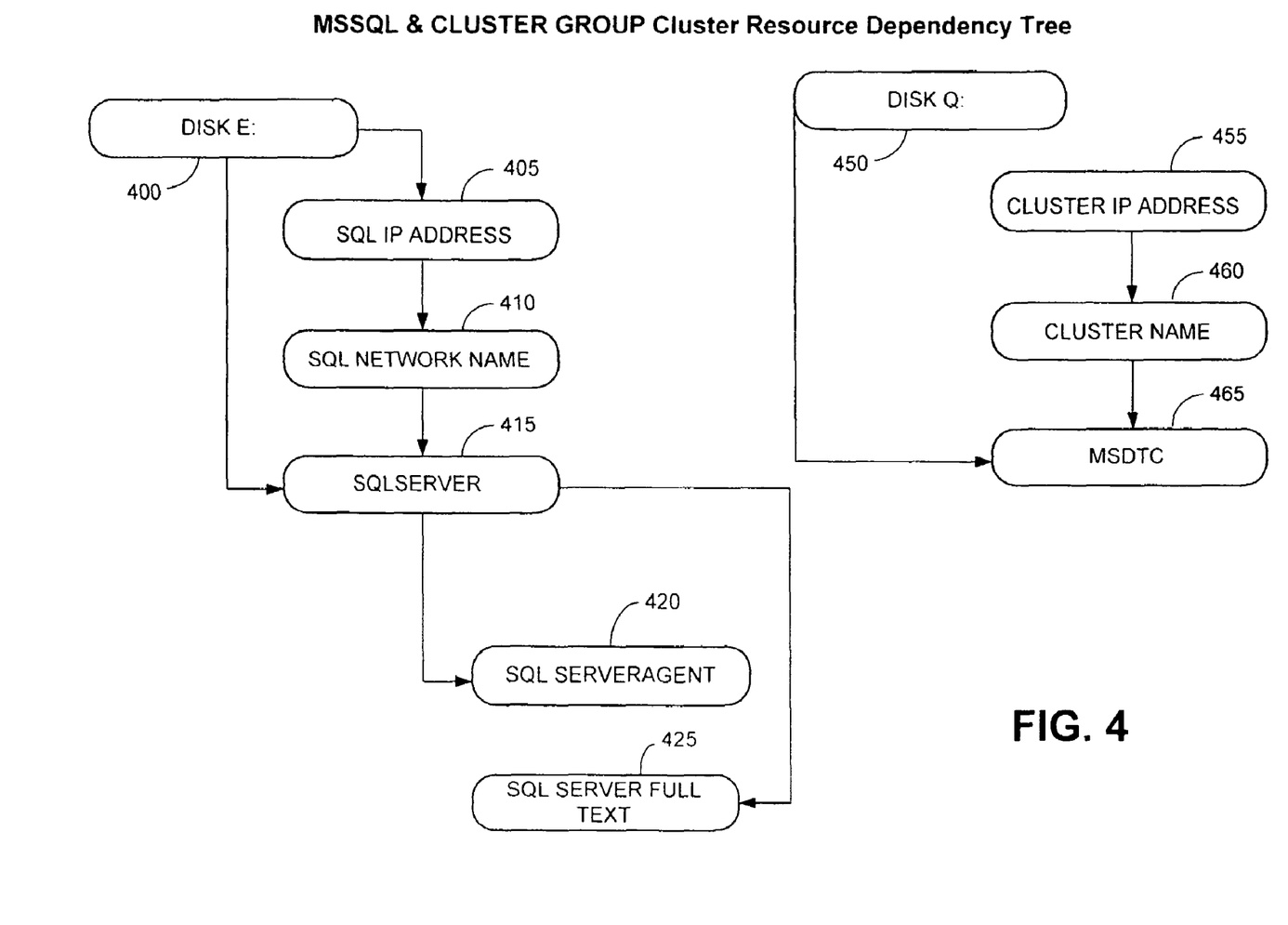
FIG. 4 is a functional block diagram showing additional cluster resource dependencies for administering the cluster, in accordance with an embodiment of the invention.

FIG. 4 is a functional block diagram showing additional cluster resource dependencies for administering the cluster, in accordance with an embodiment of the invention. The cluster Disk E: (400) is the foundation SQL resource for the cluster dependencies. Without the disk resource online all other resources will fail to be available. SQL IP Address (405) provides the database network address and SQL Network Name (410) provides the network naming, both cluster resources are dependent on Disk E: (400). The SQLSERVER (415) resources provides the database functionality and is dependent on Disk E: (400). SQLSERVER-AGENT (420) and SQL SERVER FULLTEXT (425) provide supportive services to SQLSERVER (415) and are dependent on that cluster resource for functionality.

Disk Q: (450) is dedicated to cluster as the Quorum disk, providing the essential disk resource needed for the cluster to exist. Cluster IP Address (455) and Cluster Name (460) are the primary cluster IP address and Name for administrative control, and both cluster resources depend on Disk Q: (450). MSDTC (465) provides for Microsoft Data Transaction Coordinator functions within the cluster and depends on Cluster Name (460) and Disk Q: (450).

Figure 5:
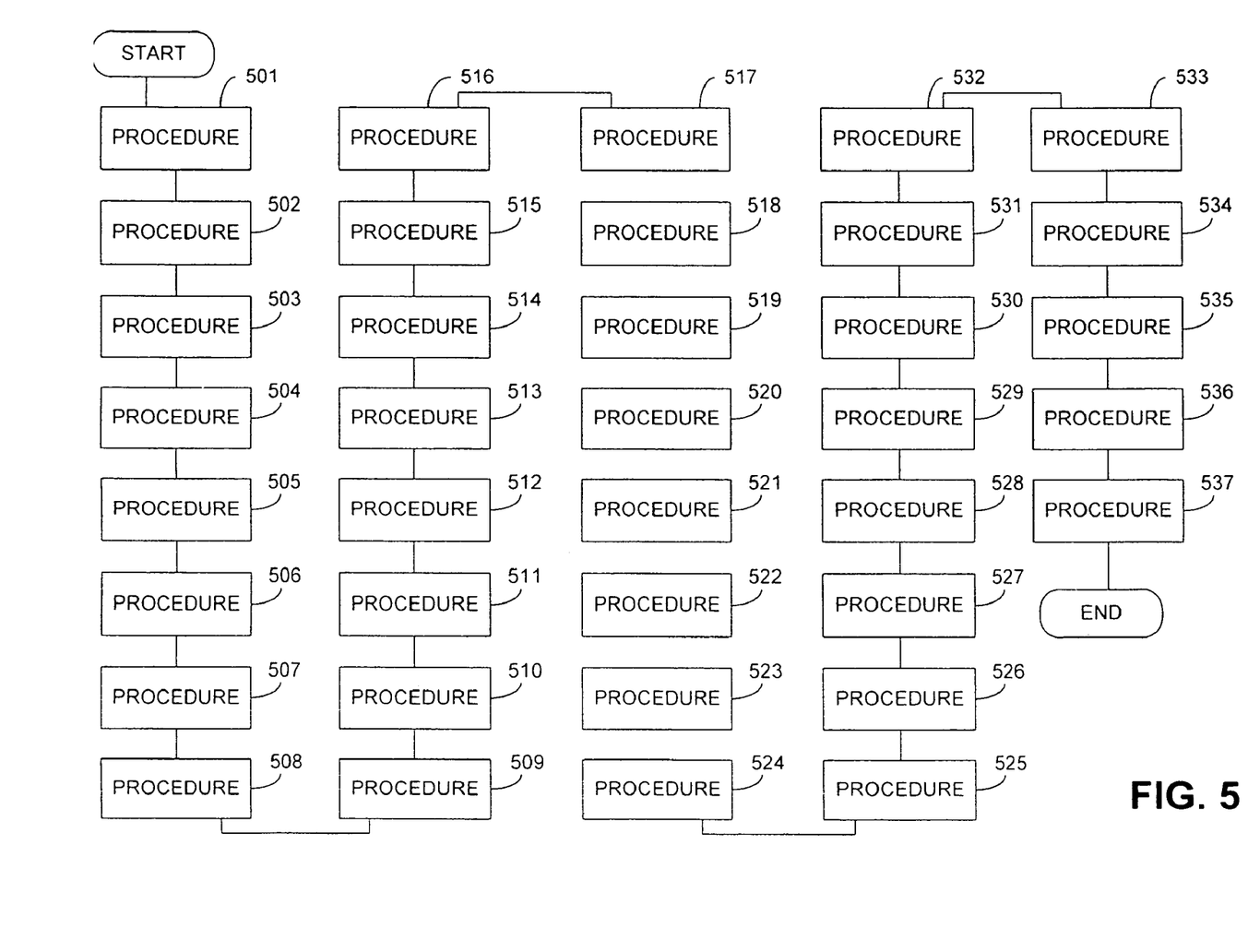
FIG. 5 is a flowchart of a method in accordance with an embodiment of the invention, where additional details are shown for a cluster procedure for eRoom 5.x.

FIG. 5 is a flowchart of a method 500 in accordance with an embodiment of the invention, where additional details are shown for a cluster procedure for eRoom 5.x. Each of the actions or procedures (501) to (538) in the Figures are described in detail in the text below. The server 105a and server 105b are also referred to as Node 1 and Node 2, respectively. The method 500 is provided for example purposes only, and should not be construed as limitations of the invention.

Procedure (501)

Install all necessary hardware for clustering. Hardware items will typically include SCSI Controller that is cluster capable and additional NICs for heartbeat networks. Make sure all hardware devices are installed in the same slots for each node.

Procedure 502

Install Windows 2000 Advanced server on Node 1 to (C:\winnt) in the disk (C:\).

Procedure 503

Once the operating system (OS) is installed, configure the networking setting and heartbeat network. Add the machine (server) to domain. Change the CD-ROM Drive letter to (Z:). Create and format partition disks (D:) and (E:) on any non-shared disk subset.

Procedure 504

Add any administrator domain global groups and the cluster administrator domain account for the domain in which the server is added as local administrators.

Procedure 505

Install SQL 2000 to Node 1. SQL Program Files to disk (C:) default location and SQL Data files to disk (E:\) default location. Select Standard installation and use default instance. Restart after installation is complete.

Procedure 506

Install eRoom 5.x SQL version. Scripts and eRoom setup files are installed to default path (C:\Inetpub) in disk (C:\). Install eRoom program files and eRoom server data to the (D:\Program Files\eRoom) in disk (D:). After this step, this (D:\Program Files\eRoom) is an ideal place to add all empty Facility shells via the eRoom administrator prior to the full back. This will save time later on creation and replication within the cluster.

Procedure 507

Add backup software agents and perform a full backup of node 1 (e.g., by use of a backup software or disk imaging product).

Procedure 508

Perform actions 501 to 504 on Node 2.

Procedure 509

After backup completes on node 1, shutdown server 105a (node 1). Change the NetBios name of node 2 to node 1 and add node 1 TCP/IP (Transmission Control Protocol/Internet Protocol) information. Remove machine from the domain and to a workgroup, and reboot. Add machine back to domain and then reboot. Add backup software agents and perform a full backup of node 2 and then reboot.

Procedure 510

Perform a full restore. Restore disks C:\, D:\, E:\ and System State, and Reboot. Then restore full Databases to SQL, and then reboot.

Procedure 511

After the restore procedure completes on node 2, since Node 2 is really Node 1 due to the full restore, change the NetBios name of node 2 to Node 2 information and add node 2 TCP/IP information back to system. Remove the machine from the domain to a workgroup, and reboot. Add machine back to domain and then reboot.

Procedure 512

Update user and password information for each ODBC connection created by eRoom. These will usually be the Server-Master and the First facility added.

Procedure 513

Launch the eRoom Server Administration MMC (Microsoft Management Console). Right click on eRoom Server icon and select SQL Settings. Reset the username and password and click the test button to verify a successful connection.

Procedure 514

Bring Node 1 back online. There should now be two (2) fully functional eRoom servers (105a and 105b) with identical facilities and rooms. Test the functionality of the eRoom servers.

Procedure 515

Change the drive letters of logical disks (D:) to (M:). Create logical disks via Disk Administrator on node 1 based on the available disk sets from the shared cluster disk subsystem 120. Ideally there would separate disks for the Quorum (Q:), eRoom Server Data (D:), and SQL installation (F:). The node should now have six logical drives, three on a non shared bus and three on the shared cluster bus.

Procedure 516

Configure the eRoom Scheduler Service to start manually on both nodes and stop the IIS web services on both nodes.

Procedure 517

Copy the M:\ProgramFiles directory to the (D:) logical drive on the newly created cluster shared disks 120. Install MS Cluster Service on Node 1. Assign the Quorum to the (Q:) logical disk. Assign the cluster name and IP and configure the Private network settings.

Procedure 518

Install MS Cluster Service on Node 2 and then join the existing cluster.

Procedure 519

Cluster the MSDTC (Microsoft Distributed Transaction Coordinator) services by running comclust (Comclust.exe) from the command line on Node 1, then on node 2.

Procedure 520

On Node 1, create a new cluster resource group for the eRoom Instance. Add the shared disk, which was assigned (D:) drive letter and contains the eRoom Server files and data.

Procedure 521

On node 2, change the drive letter of the (D:) to (M:) to facilitate the shared drive (D:) which will move over as part of the cluster on fail-over. Restart Web Services.

Procedure 522

Move the eRoom cluster resource over to node 2 as a test. Verify that eRoom is functioning properly. Move the resource back to node 1. Restart Web Services.

Procedure 523

In the eRoom Instance group of the cluster, create an IP Address resource for the IP address, which will represent the URL (Uniform Resource Locator) for eRoom access. Next, add a NetBios resource with the NetBios name desired. Bring the new resources online. There should be three resources now, a Physical disk resource (D:), IP Address and NetBios Name.

Procedure 524

Open the Internet Information Services Manager. On the default web, open the properties. Select the advanced properties. Remove the all unassigned address from the top windows, and add two IP address from the drop down menu on port 80. The addresses should be the node IP and the IP address created in the eRoom cluster resource group. Once complete, verify that the web server answers on both addresses. If FTP services are needed, open the properties window for the Default FTP site and select the IP created in the eRoom resource group.

Procedure 525

In the cluster administrator, select the eRoom resource group. Add an IIS Instance resource, make both nodes possible owners, and select the default web when asked. Perform the same process to add a FTP Instance. Verify that the web servers are answering and the eRoom is functional.

Procedure 526

Move the eRoom resource group to Node 2. On Node 2, open the Internet Information Services Manager. On the default web, open the properties. Select the advanced properties. Remove the All unassigned address from the top windows, and add two IP address from the drop down menu on port 80. The addresses should be the node IP and the IP address created in the eRoom cluster resource group. Once complete, verify that the web server answers on both addresses. If FTP services are needed, open the properties window for the Default FTP site and select the IP created in the eRoom resource group.

Procedure 527

Ensure node 1 is the current owner of the eRoom Resources Group. Create a new generic service resource for the eRoom Notifier. When prompted for registry keys needing replication add the following keys:
SYSTEM/CurrentControlSet/Services/ERNotifier,
SYSTEM/CurrentControlSet/Services/ERNotifier/enum,
SYSTEM/CurrentControlSet/Services/ERNotifier/security.

Procedure 528

On Node 1 create a new generic service resource for the eRoom Extension Manager. When prompted for registry keys needing replication add the following keys: SYSTEM/CurrentControlSet/Services/eRoom Extension Manager, SYSTEM/CurrentControlSet/Services/eRoom Extension Manager/security.

Bring the resources online. Fail over the eRoom resource group to the second node. Test eRoom functionality and then move resources back to Node 1.

Procedure 529

Verify that the web servers are answering and that the eRoom is functional. Move the eRoom resource group back to node 1.

Procedure 530

Stop all SQL services on both nodes. On node 1 backup the SQL database files, include only the MDF (Master Data File) and LDF (Log Data File) files for all the eRoom databases to (C:\DBBackup).

Procedure 531

Uninstall SQL on both nodes, then reboot.

Procedure 532

Use disk administrator to change the drive letter on node of (E:) to (N:), and then change the shared cluster disk (F:) to (E:). On Node 2 change the drive letter of the local disk (E:) to (N:).

Procedure 533

In cluster administrator, create a SQL cluster resource group. Make sure to name the resource group as the same name as the SQL instance name being applied during the Microsoft SQL installation.

Procedure 534

Perform the Microsoft SQL installation for a clustered environment. Depending the on the version of SQL, the steps for cluster installation will be different. Refer to the Cluster installation guide for SQL 7. As for SQL 2000, refer to the SQL 2000 installation instructions for clustering SQL 2000, as there are some differences between the installations.

Procedure 535

Copy the eRoom databases which were backed up to C:\DBBackup to the SQL Data directory on the shared SQL disk. Open SQL Enterprise Manager on Node 1 and connect to the new cluster instance of SQL. S elect logins and create a user that is identical to the one used during the initial eRoom installation. Attach each of the eRoom databases using the SQL attach command.

Procedure 536

On node 1, reset all the eRoom ODBC connections. Point the server 105a to new cluster instance and use the account created for login. Perform the same configuration changes to ODBC on the second node 105b.

Procedure 537

Test eRoom functionality using the virtual web address defined in the eRoom cluster resource setup for verification. Move eRoom resource group to node 2 and test again. Return eRoom resource group to node 1. Test moving the SQL resource back and forth between the cluster nodes.

Therefore, in an embodiment of the invention can provide at least one of the following functionalities:

(1) configure the eRoom application to operate in a cluster environment, such as the MICROSOFT Cluster Environment;

(2) provide the configurations steps that are used to cluster eRoom;

(3) provide additional process steps to manage eRoom in a clustered environment;

(4) permit the implementation of eRoom in a cluster environment without the need to make any modifications to eRoom;

(5) permit for exiting eRoom installations to be migrated to a clustered environment; and/or (6) permit the achievement of high availability for the eRoom application.

An embodiment of the invention may provide at least some of the following advantages.

(1) provides eRoom application redundancy;

(2) utilizes standard MICROSOFT Clustering Services and takes advantage of the native MICROSOFT clustering features;

(3) reduces the number of hardware single points of failure;

(4) eliminates the need for stand-by hardware, which is not being utilized;

(5) provides virtually no system downtime that may be caused by hardware failure and/or application failure;

(6) no requirements for modification to the eRoom application; and/or (7) can be used to enhance other applications.

The various engines discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of providing high availability enhancement for servers using structured query language comprising:

installing hardware for cluster configuration, where the hardware is used for clustering operations;

installing an operating system, SQL application, and eRoom application in a first server, wherein the eRoom application provides a web collaboration solution, and the SQL application provides database protection;

duplicating a disk image of the first server to a second server;

performing an initial cluster configuration procedure for eventually permitting the first server and second server to function in a clustered configuration, including installing a shared storage coupled to the first server and to the second server and creating a first shared logical disk, a second shared logical disk, and a third shared logical disk in the shared storage;

performing an eRoom cluster configuration procedure to permit one of the first server and second server to run the eRoom application with cluster resources installed in the shared storage in the cluster configuration, including storing disk resources for the cluster configuration in the first shared logical disk and copying program files and server data of the eRoom application from the first server to the second shared logical disk;

performing a SQL cluster configuration procedure to install the SQL application in the shared storage, including uninstalling the SQL application from the first server and the second server and installing the SQL application to the third shared logical disk;

running the eRoom application on one of the first server and second server, where the eRoom application is installed in a shared disk in the shared storage; and resetting all Open Database Connectivity Format connections for databases for eRoom applications to point the first server and the second server to the shared storage.

2. The method of claim 1, further comprising:
performing post installation testing.

3. The method of claim 1, further comprising:
moving the shared disk to the other one of the first server and second server as part of the cluster configuration on fail-over.

4. The method of claim 1, wherein the performing the initial cluster configuration procedure includes changing a first set of drive letters of disks in the first server and in the second server.

5. The method of claim 1, wherein the performing the SQL cluster configuration procedure includes changing a second set of drive letters of disks in the first server and in the second server.

6. The method of claim 1, wherein each the first server and the second server includes similar hardware components.

7. The method of claim 1, wherein the first server is the primary owner of an eRoom virtual server, while the second server is the primary owner of a SQL virtual server.

8. The method of claim 1, wherein the duplicating the disk image is performed by use of a backup software.

9. The method of claim 1, wherein the duplicating the disk image is performed by use of a disk imaging product.

10. The method of claim 1, wherein the shared storage includes a foundation eRoom resource for the cluster dependencies.

11. The method of claim 1, wherein the shared storage includes a foundation SQL resource for the cluster dependencies.

12. The method of claim 1, wherein the shared storage includes a Quorum disk to provide essential disk resource for the cluster.

13. The method of claim 1, wherein installing the operating system, SQL application, and eRoom application in the first server comprises:

installing script files and setup files of the eRoom application in a first logical disk in the first server, the first logical disk having a first drive name;

installing program files of the eRoom application and server data of the eRoom application in a second logical disk in the first server, the second logical disk having a second drive name;

installing the operating system and program files of the SQL application in the first logical disk; and installing data files of the SQL application in a third logical disk in the first server, the third logical disk having a third drive name.

14. The method of 13, wherein duplicating the disk image of the first server to the second server comprises:

duplicating a disk image of the first logical disk to a fourth logical disk in the second server;

duplicating a disk image of the second logical disk to a fifth logical disk in the second server; and duplicating a disk image of the third logical disk to a sixth logical disk in the second server.

15. The method of claim 14, wherein prior to storing disk resources for the cluster configuration in the first shared logical disk and copying program files and server data of the eRoom application from the first server to the second shared logical disk, changing the second drive name in the first server to a fourth drive name, and setting the second shared logical disk to the second drive name.

16. The method of claim 15, wherein prior to installing the SQL application to the third shared logical disk, changing the third drive name in the first server to a fifth drive name, and setting the third shared logical disk to the third drive name.

17. The method of claim 1, further comprising:
copying user databases in the first server and the second server to the third shared logical disk.

18. The method of claim 1, wherein the eRopm application will run on the first server if the first server owns the second shared logical disk, and wherein the eRoom application run on the second server if the second server owns the second shared logical disk.

19. An apparatus for providing high availability enhancement for servers using structured query language (SQL), the apparatus comprising:

a cluster configuration including a first server, a second server, and a shared storage coupled to the first server and to the second server, where an eRoom application is configured to run on one of the first server and second server, with cluster resources of the eRoom application installed in a shared disk in the shared storage, where the shared storage includes a first shared logical disk, a second shared logical disk, and a third shared logical disk, where the first shared logical disk stores disk resources for the cluster configuration, where program files and server data of the eRoom application are copied from the first server to the second shared logical disk, and where the SQL application is uninstalled from the first server and the second server and is installed to the third shared logical disk, where resources of the eRoom application and SQL application in the shared disk are configured to move to the other one of the first server and second server as part of the cluster configuration on fail-over, and where all Open Database Connectivity Format connections for databases for eRoom applications are reset in order to point the first server and the second server to the shared storage.

20. The apparatus of claim 19, wherein an initial cluster configuration procedure is performed including changing a first set of drive letters of disks in the first server and in the second server.

21. The apparatus of claim 19, wherein a SQL cluster configuration procedure is performed including changing a second set of drive letters of disks in the first server and in the second server.

22. The apparatus of claim 19, wherein each of the first server and the second server includes similar hardware components.

23. The apparatus of claim 19, wherein the first server is the primary owner of an eRoom virtual server, while the second server is the primary owner of a SQL virtual server.

24. The apparatus of claim 19, wherein a disk image in the first server is duplicated to the second server by use of a backup software.

25. The apparatus of claim 19, wherein a disk image in the first server is duplicated to the second server by use of a disk imaging product.

26. The apparatus of claim 19, wherein the shared storage includes a foundation eRoom resource for the cluster dependencies.

27. The apparatus of claim 19, wherein the shared storage includes a foundation SQL resource for the cluster dependencies.

28. The apparatus of claim 19, wherein the shared storage includes a Quorum disk to provide essential disk resource for the cluster.

29. The apparatus of claim 19, wherein script files and setup files of the eRoom application are installed in a first logical disk in the first server, where the first logical disk has a first drive name;
wherein program files of the eRoom application and server data of the eRoom application are installed in a second logical disk in the first server, where the second logical disk has a second drive name; wherein the operating system and program files of the SQL application are installed in the first logical disk; and
wherein data files of the SQL application are installed in a third logical disk in the first server, where the third logical disk has a third drive name.

30. The apparatus of 29, wherein a disk image of the first logical disk is duplicated to a fourth logical disk in the second server; wherein a disk image of the second logical disk is duplicated to a fifth logical disk in the second server; and wherein a disk image of the third logical disk is duplicated to a sixth logical disk in the second server.

31. The apparatus of claim 30, wherein prior to storing disk resources for the cluster configuration in the first shared logical disk and copying program files and server data of the eRoom application from the first server to the second shared logical disk, the second drive name in the first server is changed to a fourth drive name, and the second shared logical disk set to the second drive name.

32. The apparatus of claim 31, wherein prior to installing the SQL application to the third shared logical disk, the third drive name in the first server is changed to a fifth drive name, and the third shared logical disk is set to the third drive name.

33. The apparatus of claim 19, wherein user databases in the first server and the second server is copied to the third shared logical disk.

34. The apparatus of claim 19, wherein the eRoom application will run on the first server if the first server owns the second shared logical disk, and wherein the eRoom application will run on the second server if the second server owns the second shared logical disk.

35. An article of manufacture, comprising:
a machine-readable medium having stored thereon instructions to:
install hardware for cluster configuration, where the hardware is used for clustering operations;
install an operating system, SQL application, and eRoom application in a first server, wherein the eRoom application provides a web collaboration solution, and the SQL application provides database protection;
duplicate a disk image of the first server to a second server;
perform an initial cluster configuration procedure for eventually permitting the first server and second server to function in a clustered configuration, including installing a shared storage coupled to the first server and to the second server and creating a first shared logical disk, a second shared logical disk, and a third shared logical disk in the shared storage;
perform an eRoom cluster configuration procedure to permit one of the first server and second server to run the eRoom application with cluster resources installed in the shared storage in the cluster configuration, including storing disk resources for the cluster configuration in the first shared logical disk and copying program files and server data of the eRoom application from the first server the second shared logical disk;
perform a SQL cluster configuration procedure to install the SQL application in the shared storage, including uninstalling the SQL application from the first server and the second server and installing the SQL application to the third shared logical disk; and
reset all Open Database Connectivity Format connections for databases for eRoom applications to point the first server and the second server to the shared storage.

36. An apparatus for providing high availability enhancement for servers using structured query language (SQL), the apparatus comprising:
means for installing hardware for cluster configuration, where the hardware is used for clustering operations;
means for installing an operating system, SQL application, and eRoom application in a first server, wherein the eRoom application provides a web collaboration solution, and the SQL application provides database protection;
means for duplicating a disk image the first server second server;
means for performing an initial cluster configuration procedure for eventually permitting the first server and second server to function in a clustered configuration, including means for installing a shared storage coupled to the first server and to the second server and for creating a first shared logical disk, a second shared logical disk, and a third shared logical disk in the shared storage;
means for performing an eRoom cluster configuration procedure to permit one of the first server and second server to run the eRoom application with cluster resources installed in the shared storage in the cluster configuration, including means for storing disk resources for the cluster configuration in the first shared logical disk and for copying program files and server data of the eRoom application from the first server to the second shared logical disk;
means for performing a SQL cluster configuration procedure to install the SQL application in the shared storage, including means for uninstalling the SQL application from the first server and the second server and for installing the SQL application to the third shared logical disk; and
means for resetting all Open Database Connectivity Format connections for databases for eRoom applications to point the first server and the second server to the shared storage.

* * * * *